L. E. DRAPER.
SPRING FORK FOR BICYCLES.
APPLICATION FILED MAR. 11, 1910.
974,365.
Patented Nov. 1, 1910.
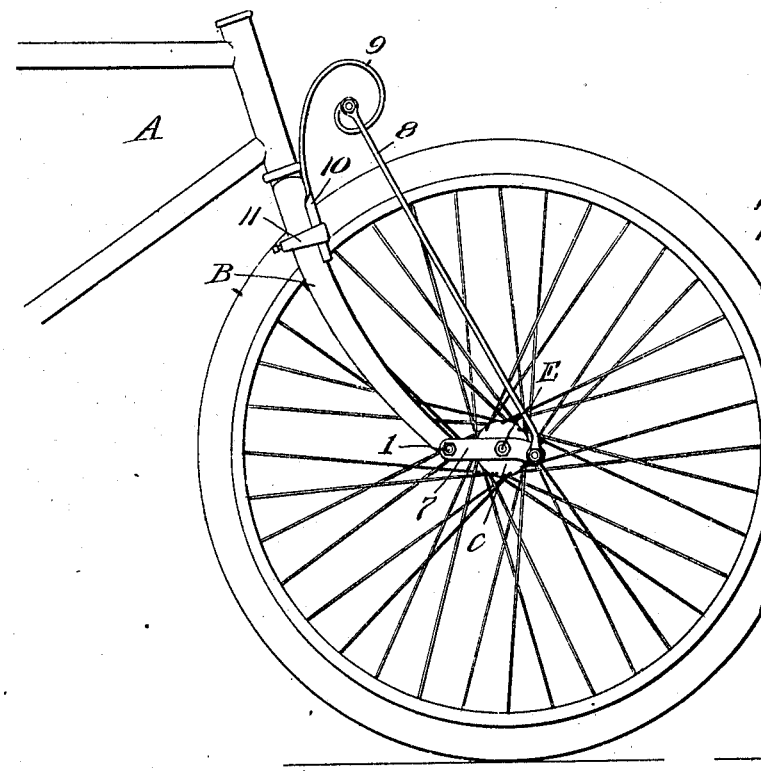
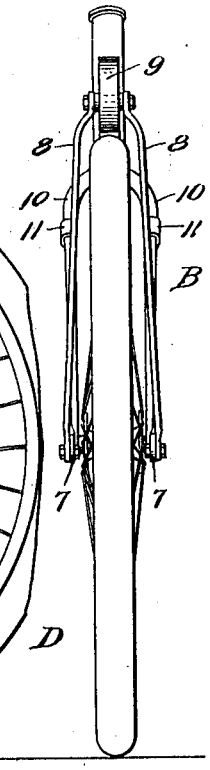
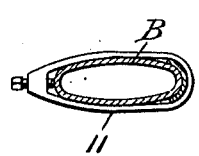
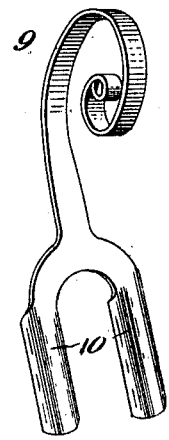
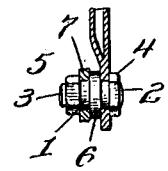
Inventor
Leo E. Draper.
Witnesses
By Victor J. Evans
Attorney

UNITED STATES PATENT OFFICE.

LEO E. DRAPER, OF SANTA CRUZ, CALIFORNIA.

SPRING-FORK FOR BICYCLES.

974,365.  Specification of Letters Patent.  Patented Nov. 1, 1910.

Application filed March 11, 1910. Serial No. 548,646.

*To all whom it may concern:*

Be it known that I, LEO E. DRAPER, a citizen of the United States of America, residing at Santa Cruz, in the county of Santa Cruz and State of California, have invented new and useful Improvements in Spring-Forks for Bicycles, of which the following is a specification.

This invention relates to cushioning forks for bicycles, motorcycles, or similar vehicles, and the object of the invention is to provide cushioning means obviating the usual unpleasant jar or shaking motion incident to vibrations when the bicycle or vehicle is driven over rough or uneven surfaces.

In the drawing, forming a portion of this specification and in which like numerals of reference indicate similar parts in the several views:—Figure 1 is a detail side elevation of a portion of a bicycle showing my improvement applied thereto. Fig. 2 is a detail front view thereof. Fig. 3 is a detail section through a portion of the fork showing the manner of connecting the spring thereto. Fig. 4 is a detail section through a portion of the fork showing the manner of connecting one of the links thereto. Fig. 5 is a detail perspective view of the spring.

It is my aim in the construction of the attachment to be hereinafter fully set forth to form it so that it can be applied to the forks of a bicycle without changing the construction of the same. While the attachment is extremely desirable for use in connection with the front fork of the bicycle it will be understood that it may, if desired, be applied to the rear fork without departing from the essence of the invention.

A portion of a bicycle A is shown in Fig. 1 of the drawing, it being provided as shown with the usual front fork B, whose arms are spaced from each other to receive the wheel as in the usual manner. The lower extremities of the arms of the fork are provided with perforations, as shown, for the reception of bolts 1 which are each formed with threaded extremities 2 and 3 for receiving the clamping nuts 4 and 5. Each bolt is provided intermediate of its ends with a stop collar 6 which is adapted to abut against one side of the arm of the fork and to be held thereto through the provision of the clamping nut 4. Outwardly of the stop collar 6, each bolt is provided with a smooth portion which receives the eye at the inner end of a link or wheel-supporting member 7. The inner ends of the links are operatively held on the bolts by the clamping nuts 5 as will be understood. The construction described is such that the links 7 are spaced from each other and disposed at the sides of the hub C of the wheel D and they are perforated to form bearings for the reception of the supporting axle E. The outer extremities of the links 7 are pivotally connected to the lower ends of rods 8, the upper ends of these rods being connected together and secured to the extremity of the convolute portion of a spring 9. The opposite end of this spring is forked, and its arms 10 are secured to the arms of the fork B by suitable clamps 11.

The construction of the attachment herein set forth and described is such that it may be applied to bicycles of any construction without changing them in any way whatsoever.

It may be stated that the links 7 are so constructed that the perforations intermediate of their ends may receive the pivots for connecting the lower extremities of the rods 8 to such links and the trunnions of the wheel may be moved into the perforations at the outer ends of the links. Should it be desired to change the positions of the rods so that their extremities are pivoted midway between the ends of the links more elasticity of the spring may be had and the attachment when thus applied to the bicycle will be capable of withstanding the weight of a light person while when the rods 8 are connected in the manner shown the spring will be somewhat stiffened and will be capable of withstanding a greater weight, as is obvious.

I claim:—

An attachment for bicycles comprising a spring having a portion removably secured to the fork of the bicycle, spaced wheel supporting links pivotally connected at their inner ends to the arms of the fork, and connecting rods pivoted at their lower ends to the outer terminals of the links and pivoted at their upper ends to the free terminal of the spring.

In testimony whereof I affix my signature in presence of two witnesses.

LEO E. DRAPER.

Witnesses:
  W. H. DOOL,
  EMMET C. RITTENHOUSE.